(12) United States Patent
Sturgis et al.

(10) Patent No.: US 6,326,429 B1
(45) Date of Patent: Dec. 4, 2001

(54) POLYMERIC ORGANIC CARBONATE MATERIALS USEFUL AS FILLERS FOR INVESTMENT CASTING WAXES

(75) Inventors: David Howard Sturgis, Boring; Mehrdad Yasrebi, Clackamas; Karl Milton Taft, III, Portland; Michael Gerald Sorbel, Oregon City, all of OR (US)

(73) Assignee: PCC Structurals, Inc., Portland, OR (US)

( * ) Notice: Subject to any disclaimer, the term of this patent is extended or adjusted under 35 U.S.C. 154(b) by 0 days.

(21) Appl. No.: 09/366,804

(22) Filed: Aug. 4, 1999

(51) Int. Cl.$^7$ ..................................................... C08K 5/01
(52) U.S. Cl. ......................... 524/487; 523/139; 523/141
(58) Field of Search ............................ 524/487; 523/139, 523/141

(56) References Cited

U.S. PATENT DOCUMENTS

| | | |
|---|---|---|
| 3,248,414 | 4/1966 | Stevens . |
| 3,248,415 | 4/1966 | Stevens . |
| 3,248,416 | 4/1966 | Stevens . |
| 4,633,929 | 1/1987 | Santangelo et al. . |
| 4,698,390 | 10/1987 | Robeson et al. . |
| 4,773,466 | 9/1988 | Cannarsa et al. . |
| 4,814,370 | 3/1989 | Kramer et al. . |
| 4,874,030 | 10/1989 | Kuphal et al. . |
| 4,882,110 | 11/1989 | Kramer et al. . |
| 4,912,149 | 3/1990 | Robeson et al. . |
| 4,940,733 | 7/1990 | Kuphal et al. . |
| 4,981,948 | 1/1991 | Kawachi et al. . |
| 5,021,213 * | 6/1991 | Nishio et al. ........................... 419/36 |
| 5,035,275 | 7/1991 | Yamaguchi . |
| 5,089,070 | 2/1992 | McAndrew . |
| 5,176,188 | 1/1993 | Quinn et al. . |

FOREIGN PATENT DOCUMENTS

| | | |
|---|---|---|
| 300 039 | 1/1992 | (EP) . |
| 526 490 | 7/1994 | (EP) . |

* cited by examiner

*Primary Examiner*—Edward J. Cain
(74) *Attorney, Agent, or Firm*—Klarquist Sparkman LLP

(57) ABSTRACT

Wax compositions that are useful, amongst other things, for forming investment casting patterns are described. One embodiment of the wax composition comprises: (a) pattern wax; and (b) from about 1% to about 85% by weight of a polymeric organic carbonate filler material. Examples of particular polymeric organic carbonate filler materials include, without limitation, polyethylene carbonate, polypropylene carbonate, poly(cyclohexane carbonate), poly(cyclohexane propylene carbonate), and mixtures thereof. Crosslinking the organic portion of the polymeric organic carbonate filler material can substantially reduce its thermal expansion. The wax compositions generally include other materials commonly used to form wax compositions. Such materials include waxes and resinous materials, conventional fillers, ultra-violet curable monomers, plasticizers, lubricants, and mixtures thereof. Conventional fillers, including urea, can be copolymerized with the polymeric organic carbonate filler material to reduce the dissolution and/or agglomeration of the filler. Wax patterns useful for forming investment casting molds are then made from such compositions using conventional techniques, such as injection molding. The patterns are serially immersed in slurries comprising refractory materials to form casting molds. Metal and metal alloy articles are then cast using such molds.

45 Claims, 4 Drawing Sheets

POLYMERIC ORGANIC CARBONATE MATERIALS USEFUL AS FILLERS FOR INVESTMENT CASTING WAXES

FIELD OF THE INVENTION

The present invention concerns investment casting processes and compositions useful for investment casting, particularly polymeric organic carbonate fillers for wax compositions that are formed into patterns about which casting molds are prepared.

BACKGROUND

Investment casting involves introducing molten metal into molds made from refractory materials, such as ceramics. Slurries containing refractory material and other materials, such as binders, dispersing aids, etc., are formed. A pattern formed from a wax composition is immersed in a first slurry, which deposits refractory material on the pattern's surface. Stucco material is applied to the refractory material. The first such layer applied to the pattern is referred to as the facecoat, and contacts the metal during the casting process. Plural additional layers are then applied to the pattern to form the mold. The pattern is removed from inside the mold by heating the mold/pattern composite. Removing the pattern forms an internal void in the mold having the shape of the desired article. Molten metal is poured into the void and allowed to solidify. The mold is then removed from about the article.

Pattern waxes are commercially available from a number of vendors, Pattern wax compositions used in conventional casting processes typically include significant amounts of filler materials, such as at least 30% filler. Examples of conventional fillers include urea and water. Fillers are added to the wax compositions for a number of reasons, including to reduce the amount of wax used, and to change certain physical properties of the wax composition, such as shrinkage.

Pattern wax and wax fillers generally are partially or totally removed from the mold prior to pouring metal. Wax and wax fillers typically are removed from the mold by first autoclaving the mold/pattern composite, followed by firing under oxygen-rich environments to remove any remaining residues. Certain known fillers, such as acrylates, are difficult to burn completely.

Moreover, firing operations can result in the release of volatile organic compounds (VOCs). The investment casting industry works under stringent environmental regulations governing the release of VOCs into the atmosphere. Methods commonly used to control atmospheric release of VOCs include after-burners and incinerators. Using these known methods to comply with environmental regulations is both technologically and financially difficult. Furthermore, the Environmental Protection Agency likely will promulgate even more stringent regulations regarding the atmospheric release of VOCs in the near future.

Polyalkylene carbonates have been used in the casting industry, and some inventions using polyalkylene carbonates have been patented. For example, EPO 300 039 B1 (EP '039) concerns ceramic-making compositions that contain polyalkylene carbonate binders, particularly polyethylene and polypropylene carbonate binders. These binders were investigated because they completely decompose, volatilize rapidly at relatively low temperatures, and are nontoxic. EP '039 states that polyalkylene carbonates thermally decompose to form carbon dioxide and water.

Santangelo et al.'s U.S. Pat. No. 4,633,929 (Santangelo) concerns a method for producing metal castings by evaporative pattern casting (sand casting) using patterns made from polyalkylene carbonates. The polyalkylene carbonate material (such as polypropylene carbonate) is shaped into the desired casting pattern. The pattern is optionally coated with a refractory coating, such as a silica/water-based slurry, and then embedded in support material, such as sand. Thermal decomposition of this class of polymer indicates a sharp decomposition into mainly $CO_2$ and $H_2O$ products, with almost no trace of residual ash. This results in few, if any, surface flaws on the metal castings, which are prevalent on metal castings made using polystyrenes, polyurethanes or similar organic foams.

Cannarsa et al.'s U.S. Pat. No. 4,773,466 (Cannarsa) concerns a method for preparing a polycarbonate copolymer foam suitable for lost-foam casting. Cannarsa is particularly concerned with making patterns using polyalkylene carbonates made from cyclic alkylene precursors (such as cycloheptene oxide, cyclohexene oxide and cyclopentene oxide), which are coated with a refractory for use as patterns.

Kawachi et al.'s U.S. Pat. No. 4,981,948 (Kawachi) concerns a zinc-containing solid catalyst useful for preparing polyalkylene carbonates. Kawachi states that "polymers produced by the process of the invention have a good transparency and can be completely decomposed by heating. For these properties, they find applications as materials for the production of optical fibers, optical discs, ceramic binders, and lost foam castings in addition to as general purpose shaped structures, including films and fibers." Kawachi, at column 6, lines 6–14. Emphasis added.

Kuphal et al.'s U.S. Pat. No. 4,874,030 concerns blends of polypropylene carbonate and poly(methyl methacrylate). These polymeric blends are used in decomposition molding and as binders for ceramic particles. Kuphal, column 2, lines 54–67.

Quinn et al.'s U.S. Pat. No. 5,176,188 (Quinn) is particularly directed to investment casting processes. Quinn concerns a method and composition for forming investment casting patterns that include thermally collapsible microspheres. Example 1 of Quinn teaches that the wax pattern composition can include polyalkylene carbonates, particularly 5.1 weight percent polypropylene carbonate.

Kramer et al.'s U.S. Pat. Nos. 4,814,370 and 4,882,110 (referred to collectively as Kramer) concern polyalkylene carbonates as binders useful for making and shaping a green body of ceramic powder and producing a formed ceramic body. The method comprises mixing ceramic powders with binders comprising a polyalkylene carbonate, preferably polyethylene or polypropylene carbonates. These materials are used to provide workability and green strength to ceramic structures, and because they completely burn-out during sintering to leave minimal residual ash in the sintered body.

Despite these prior inventions, there still is a need for processes and compositions for making pattern wax compositions for the investment casting industry that reduce emission of VOCs, as well as provide other benefits.

SUMMARY

The present invention concerns wax compositions that include polymeric organic carbonate fillers. The wax compositions are useful, amongst other things, for forming investment casting patterns. One embodiment of the composition comprises pattern wax, and from about 1% to about 85% by weight of a polymeric organic carbonate filler material. The polymeric organic carbonate filler material can be any of a number of materials, or mixtures of such materials, as discussed in more detail below. Working embodiments of pattern waxes typically used a polymeric organic carbonate filler material selected from the group consisting of (a) inter- and/or intra-crosslinked polymeric organic carbonates, (b) inter- and/or intra-crosslinked copolymers of organic carbonates and organic noncarbonates, (c) homogeneous and heterogeneous mixtures of at least one polymeric organic carbonate and at least one polymeric organic noncarbonate, at least one of the polymeric organic carbonate or polymeric organic noncarbonate being inter- and/or intra-crosslinked, and (d) homogeneous and heterogeneous mixtures of at least one inter- and/or intra-crosslinked copolymer of an organic carbonate and an organic noncarbonate and at least one polymeric organic noncarbonate. Examples of particular polymeric organic carbonate filler materials include, without limitation, polyethylene carbonate, polypropylene carbonate, poly(cyclohexane carbonate), poly(cyclohexane propylene carbonate), and mixtures thereof. Such compositions typically include from about 5% to about 75% by weight polymeric organic carbonate filler material, more typically from about 10% to about 50% by weight polymeric organic carbonate filler material, with working embodiments having from about 30% to about 40% by weight polymeric organic carbonate filler material.

The polymeric organic carbonate fillers can be used to reduce the thermal expansion of a wax composition. Crosslinking the filler material can substantially reduce its thermal expansion. Consequently, the polymeric organic carbonate filler material can be crosslinked.

The wax compositions generally include other materials commonly used to form wax compositions. Such materials include various waxes and resinous materials, conventional fillers, ultra-violet curable monomers, plasticizers, lubricants, and mixtures thereof. A common conventional filler material is urea. Conventional fillers, including urea, can be copolymerized with the polymeric organic carbonate filler material. This helps reduce the dissolution and/or agglomeration of the filler.

Wax patterns useful for forming investment casting molds are then made from such compositions using conventional techniques, such as injection molding. The patterns are serially immersed in slurries comprising refractory materials to form casting molds. Metal and metal alloy articles are cast by introducing molten metals or alloys into such molds and allowing the molten material to solidify. The molds are then removed from about the cast metal or alloy article.

DETAILED DESCRIPTION

Figure 1:
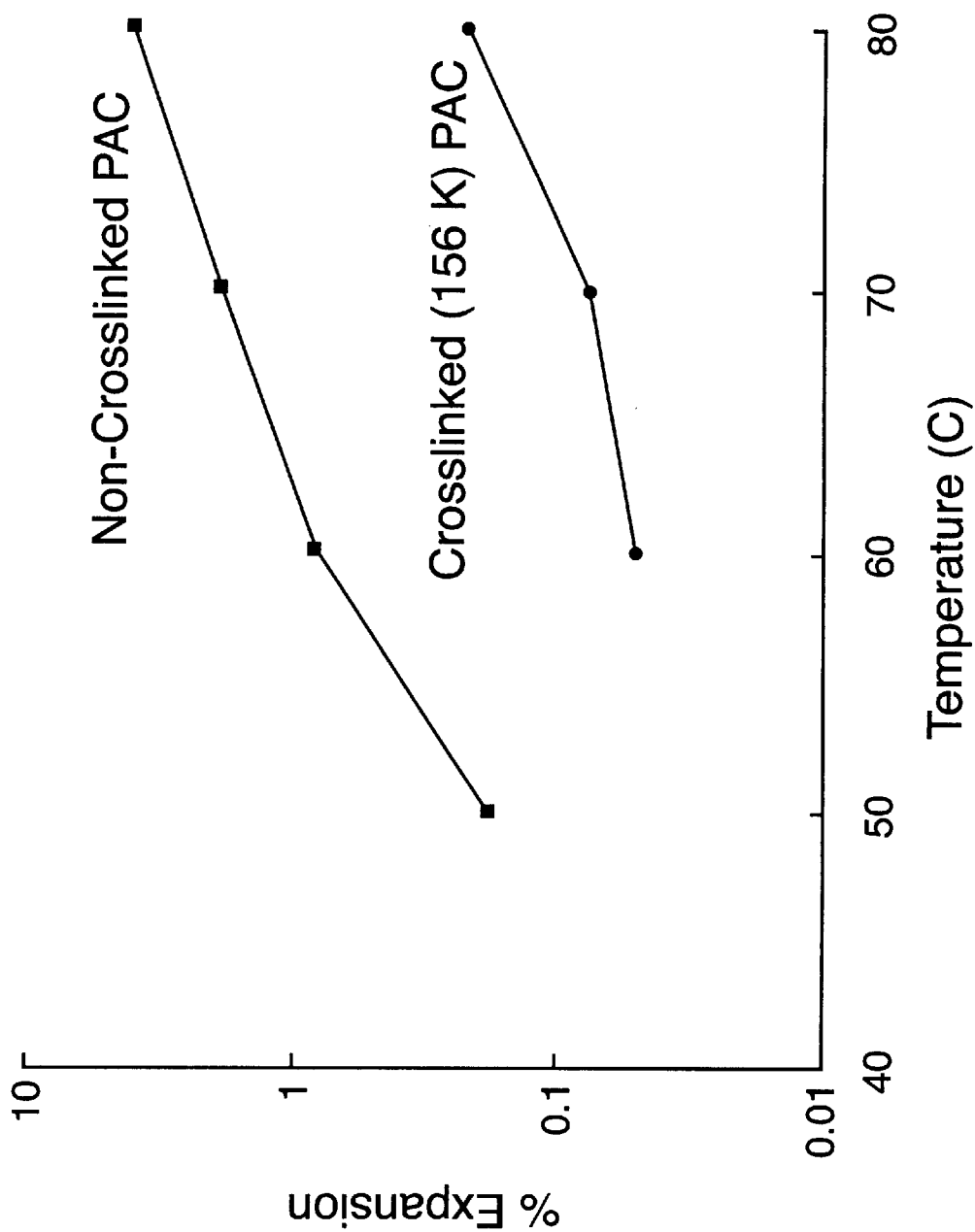
FIG. 1 is a graph showing thermal expansion of crosslinked and non-crosslinked polymeric organic carbonate fillers versus temperature.

The present invention concerns forming wax compositions comprising polymeric organic carbonate fillers, and methods for using these compositions to make patterns that are then used to produce metal and/or alloy articles by investment casting processes. Examples of suitable filler materials, methods for forming working embodiments of wax pattern compositions, and methods for casting articles using molds made from such wax patterns are described below.

I. Pattern Wax Filler Materials
A. Polymeric Organic Carbonate Filler Materials Various organic-carbonate-based filler materials are useful for forming wax patterns for investment casting. All such materials are collectively referred to herein as polymeric organic carbonates, polymeric organic carbonate fillers or polymeric organic carbonate materials. Examples, without limitation, of polymeric organic carbonate materials useful as fillers for wax compositions include: inter- and/or intra-crosslinked polymeric organic carbonates; (b) inter- and/or intra-crosslinked copolymers of organic carbonates and organic noncarbonates; (c) inter- and/or intra-crosslinked block copolymers of organic carbonates and organic noncarbonates; (d) homogeneous and heterogeneous mixtures of at least one inter- and/or intra-crosslinked polymeric organic carbonate and at least one inter- and/or intra-crosslinked polymeric organic noncarbonate; (e) homogeneous and heterogeneous mixtures of at least one polymeric organic carbonate and at least one polymeric organic noncarbonate, at least one of the polymeric organic carbonate or polymeric organic noncarbonate being inter- and/or intra-crosslinked; (f) homogeneous and heterogeneous mixtures of at least one inter- and/or intra-crosslinked copolymer of an organic carbonate and an organic noncarbonate and at least one polymeric organic noncarbonate; (g) homogeneous and heterogeneous mixtures of at least one inter- and/or intra-crosslinked block copolymer of an organic carbonate and an organic noncarbonate, and at least one polymeric organic noncarbonate; (h) homogeneous and heterogeneous mixtures of at least one inter- and/or intra-crosslinked copolymer of an organic carbonate and an organic noncarbonate and at least one inter- and/or intra-crosslinked polymeric organic noncarbonate; (i) homogeneous and heterogeneous mixtures of at least one inter- and/or intra-crosslinked block copolymer of an organic carbonate and an organic noncarbonate and at least one inter- and/or intra-crosslinked polymeric organic noncarbonate; (j) homogeneous and heterogeneous mixtures of at least one copolymer of an organic carbonate and an organic noncarbonate and at least one inter- and/or intra-crosslinked polymeric organic noncarbonate; (k) homogeneous and heterogeneous mixtures of at least one block copolymer of an organic carbonate and an organic noncarbonate and at least one inter- and/or intra-crosslinked polymeric organic noncarbonate; (l) conventional fillers in admixture with any of the preceding (a)–(k); (m) homogeneous and heterogeneous mixtures of at least two of (a)–(k); and (n) homogeneous and heterogeneous mixtures of at least two of (a)–(k), wherein length of separation between such materials is from about 0 μm to about 400 μm. Working embodiments of the present invention typically have used polymeric organic carbonate materials selected from the group consisting of (a) interand/or intra-crosslinked polymeric organic carbonates, (b) inter- and/or intra-crosslinked copolymers of organic carbonates and organic noncarbonates, (c) homogeneous and heterogeneous mixtures of at least one polymeric organic carbonate and at least one polymeric organic noncarbonate, at least one of the polymeric organic carbonate or polymeric organic noncarbonate being inter- and/or intra-crosslinked, and (d) homogeneous and heterogeneous mixtures of at least one inter- and/or intra-crosslinked copolymer of an organic carbonate and an organic noncarbonate and at least one polymeric organic noncarbonate.

Polymeric organic carbonate materials as described herein are commercially available from, for example, PAC Polymers Inc., of Newark, Del. Moreover, methods for making polymeric organic carbonate materials are known, some of which are described in the patent literature. For example, Kawachi et al.'s U.S. Pat. No. 4,981,948 (Kawachi), which is incorporated herein by reference, concerns a zinc-containing solid catalyst useful for preparing polyalkylene carbonates.

Terms used in the preceding paragraph to define the polymeric organic carbonate materials useful for practicing the present invention are defined as follows. However, such definitions are primarily for the reader's convenience, and should not be construed to limit the present invention to a scope less than that understood by a person of ordinary skill in the art.

As used herein, "carbonate" is a material that includes a carbonate ($-CO_3$) coupled to an organic portion, such as an aliphatic or aromatic compound coupled to a carbonate group to form a carbonate ester. "Polymeric organic carbonate" refers to any carbonate, examples of which are provided above, produced by polymerizing monomers.

A "copolymer" is a material produced by the simultaneous polymerization of two or more dissimilar monomers.

A block copolymer is a molecule comprising alternating sections of one chemical composition separated by sections of a different chemical composition.

As used herein, a homogeneous association of materials refers to molecularly mixed materials. A homogeneous association of materials can be produced by, for example, fusing, melting, dissolving in a cosolvent, etc.

A heterogeneous association of materials refers to all associations other than homogeneous associations.

Crosslinking refers to attachment of one portion of a polymer chain to another portion of the same polymer chain (intra-crosslinking), or to attachment of one polymer chain to a different polymer chain that is the same as or different from the first polymer chain (inter-crosslinked).

Specific examples of polyalkylene carbonates used to form working embodiments of wax fillers of the present invention include polyethylene carbonates and polypropylene carbonates. An example of a polycycloorganic carbonate found to be a suitable filler material for pattern waxes is polycyclohexane carbonate. An example of a polyaromatic carbonate suitable as filler for pattern wax compositions is polystyrene. An example of a copolymer (or block copolymer) filler is polycyclohexane propylene carbonate-polystyrene.

Mixtures of classes of polymeric organic carbonate filler materials also can be used. For example, a first filler material comprising a polyalkylene carbonate can be used in combination with a polycycloorganic carbonate and/or a copolymer carbonate. It also should be understood that these materials are examples only. Any polymeric organic carbonate filler material suitable for use as a pattern wax filler is within the scope of the present invention.

The size of the polymeric organic carbonate filler particle used to form wax patterns also can vary. Fillers having a particular particle size or particle-size distribution can be selected for a particular purpose. Filler particles useful for forming wax patterns typically will have a diameter of from about 1 $\mu$m to about 500 $\mu$m; more typically from about 1 $\mu$m to about 100 $\mu$m; even more typically from about 5 $\mu$m to about 50 $\mu$m; and preferably from about 10 $\mu$m to about 20 $\mu$m. The best results currently are being achieved using filler particles having an average diameter of about 15 $\mu$m.

B. Non-crosslinked and Crosslinked Filler Materials

As indicated above, polymeric organic carbonate filler materials can be noncrosslinked or crosslinked. One effect of crosslinking the polymeric organic carbonate filler material is to reduce the thermal expansion of the material relative to the same material without being crosslinked. Thermal expansion is an important consideration in determining whether a material, or combination of materials, is useful as wax filler for forming wax patterns. Crosslinking can be used to obtain a desired thermal expansion. Crosslinking generally decreases the thermal expansion coefficient of the filler material. Data supporting this conclusion is provided below in Example 1.

Mixtures of noncrosslinked and crosslinked polymeric organic carbonate filler materials also can be used as fillers to form wax compositions. The ratio of crosslinked-to-noncrosslinked material can vary from application-to-application, and such ratio is best determined by considering whether the pattern wax composition has traits, such as those that are listed above, that are desirable in such a composition.

C. Dissolution/Aggregation of Materials during Processing

Urea is an example of a water-soluble material commonly used as a filler material for forming pattern wax compositions. Urea dissolves into the aqueous slurries used to deposit refractory materials onto the pattern, which is disadvantageous to the investment casting process. Urea dissolution can be reduced by using a urea filler or fillers in combination with an polymeric organic carbonate filler material or materials as described herein. Data supporting this is provided below in Examples 2–3. Relative to a control wax composition comprising urea and no carbonate material filler, the addition of a polymeric organic carbonate filler material as described herein reduced urea dissolution from 100% for the control to at least as low as 50%.

Dissolution and/or aggregation of filler particles, such as urea particles, can be reduced by the addition of a polymeric organic carbonate filler material. For example, working embodiments of the present invention have combined polymeric organic carbonate filler materials with urea. The polymeric organic carbonate materials were then crosslinked after mixing. This helps coat the urea particles with the polymeric organic carbonate filler material. This has been shown to substantially decrease the dissolution and/or aggregation of urea filler particles from wax compositions.

II. Forming Wax Compositions Comprising Polymeric Organic Carbonate Materials

Wax compositions for forming patterns are prepared by combining the polymeric organic carbonate filler materials described above with conventional materials used to form such compositions with sufficient agitation or stirring to provide a substantially homogenous composition. More specifically, an appropriate wax is first obtained and then melted. Polymeric organic carbonate filler materials are then added to the melted wax. The wax, polymeric organic carbonate filler material, and perhaps other materials commonly used with such wax compositions, are then blended together. Examples of conventional materials commonly added to wax compositions include, but are not limited to, various waxes and resinous materials, conventional fillers, ultra-violet curable monomers, plasticizers, lubricants, and mixtures thereof. Patterns having desired shapes are then formed from the composition by conventional techniques, such as stereolithography and injection molding.

A number of factors can be considered to help determine the amount of polymeric organic carbonate filler to add to a particular wax composition. These factors include composition viscosity, filler morphology, size and distribution of the filler materials in the composition, desired thermal expansion coefficient, filler density and filler surface area. These factors can be considered to further refine the determination of the amount of polymeric organic carbonate filler used to form a particular wax composition within the range of from about 1% to about 85% polymeric organic carbonate filler material by weight, typically from about 5% to about 75%, more typically from about 10% to about 50%, with working embodiments of pattern wax compositions having from about 30% to about 40% polymeric organic carbonate filler by weight.

III. Examples

The following examples are provided to illustrate certain specific features of working embodiments of the present invention. The scope of the present invention should not be limited to those particular features exemplified.

EXAMPLE 1

Two different samples of poly(cyclohexane carbonate) were obtained. The first sample was a noncrosslinked poly (cyclohexane carbonate). The second sample was a 156K crosslinked poly(cyclohexane carbonate), which was produced by crosslinking polymer chains having a molecular weight of 156,000. These samples were received as powders.

The powders were placed in a die and pressed at about 110,000 psi to form pills. The pills were approximately 0.185 inch in diameter and ranged from about 0.180 inch to about 0.240 inch in length.

These pills were then heated from room temperature at a rate of 1° C./minute to ascertain each pill's thermal expansion. The thermal expansion of each pill was measured using a DuPont9900 TMA instrument.

FIG. 1 is a graph of the thermal expansion of such pills versus temperature. FIG. 1 shows that crosslinking the poly(cyclohexane carbonate) reduces the thermal expansion of the material. For example, at 60° C., the percent expansion of the noncrosslinked poly(cyclohexane carbonate) was about 1%. In comparison, the crosslinked poly(cyclohexane carbonate) [156K sample] had a thermal expansion of only about 0.1%.

Figure 2:
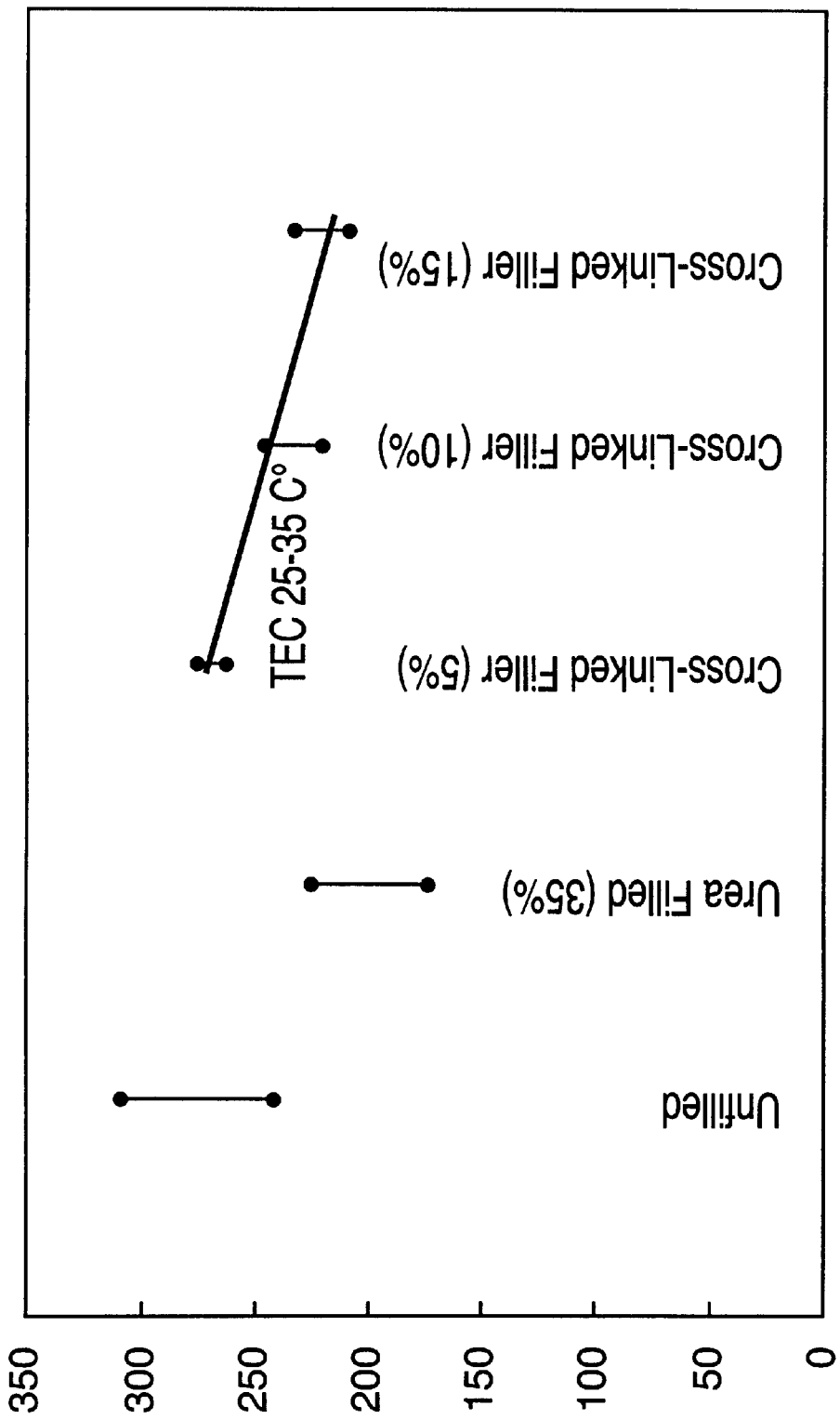
FIG. 2 is a graph of the thermal expansion coefficient for a pattern wax with differing amounts of a crosslinked polymeric organic carbonate filler material.

FIG. 2 also illustrates the effects of adding crosslinked polymeric organic carbonate fillers to conventional waxes. FIG. 2 is a graph of the thermal expansion coefficient (% linear expansion/° C.) for (1) a conventional wax having no filler, (2) a conventional wax having 35% by weight urea filler, (3) a conventional wax having about 5% by weight of a polyalkylene carbonate crosslinked filler, (4) a conventional wax having about 10% by weight of a polyalkylene carbonate crosslinked filler, and (5) a conventional wax having about 15% by weight of a polyalkylene carbonate crosslinked filler. FIG. 2 shows that adding the crosslinked polymeric organic carbonate filler material to conventional wax reduced the thermal expansion of the wax to values similar to that obtained using urea filler. One problem associated with urea as a filler material, as discussed further below, is the tendency of such materials to dissolve into the processing slurries, or precipitate in the ceramic shells. But, urea also is relatively cheap. FIGS. 1 and 2 indicate that the amount of urea used as a filler material can be reduced by adding a polymeric organic carbonate filler material as described herein to pattern wax compositions without deleteriously effecting the thermal expansion of the wax composition.

EXAMPLE 2

Samples of crosslinked poly(cyclohexane carbonate) were obtained and pressed into pills as described above in Example 1. Certain pills made also included urea: a first sample included about 29.6% urea; a second sample contained about 37.8% urea; and a third sample contained about 49.6% urea. Non-urea filled poly(cyclohexane carbonate) and 100% urea were used as standards. Urea-filled samples were made by first mixing appropriate amounts of urea with the poly(cyclohexane carbonate) to coat the urea with the poly(cyclohexane carbonate). The poly(cyclohexane carbonate) was thereafter crosslinked.

Two pills of each sample were weighed and then placed into 40 milliliters of deionized water. The containers were covered and maintained at room temperature for 40 hours. The water remaining was removed by vacuum. This left the pill and any precipitated urea that had been leached from the pills.

Urea was used as a standard because it has been used as wax filler for years by the casting industry. Urea is water soluble. This can be a good attribute because urea can be removed from molds using steam. However, water solubility also means that urea can be leached out of wax formulations solely by ambient humidity or water from slurries.

Figure 3:
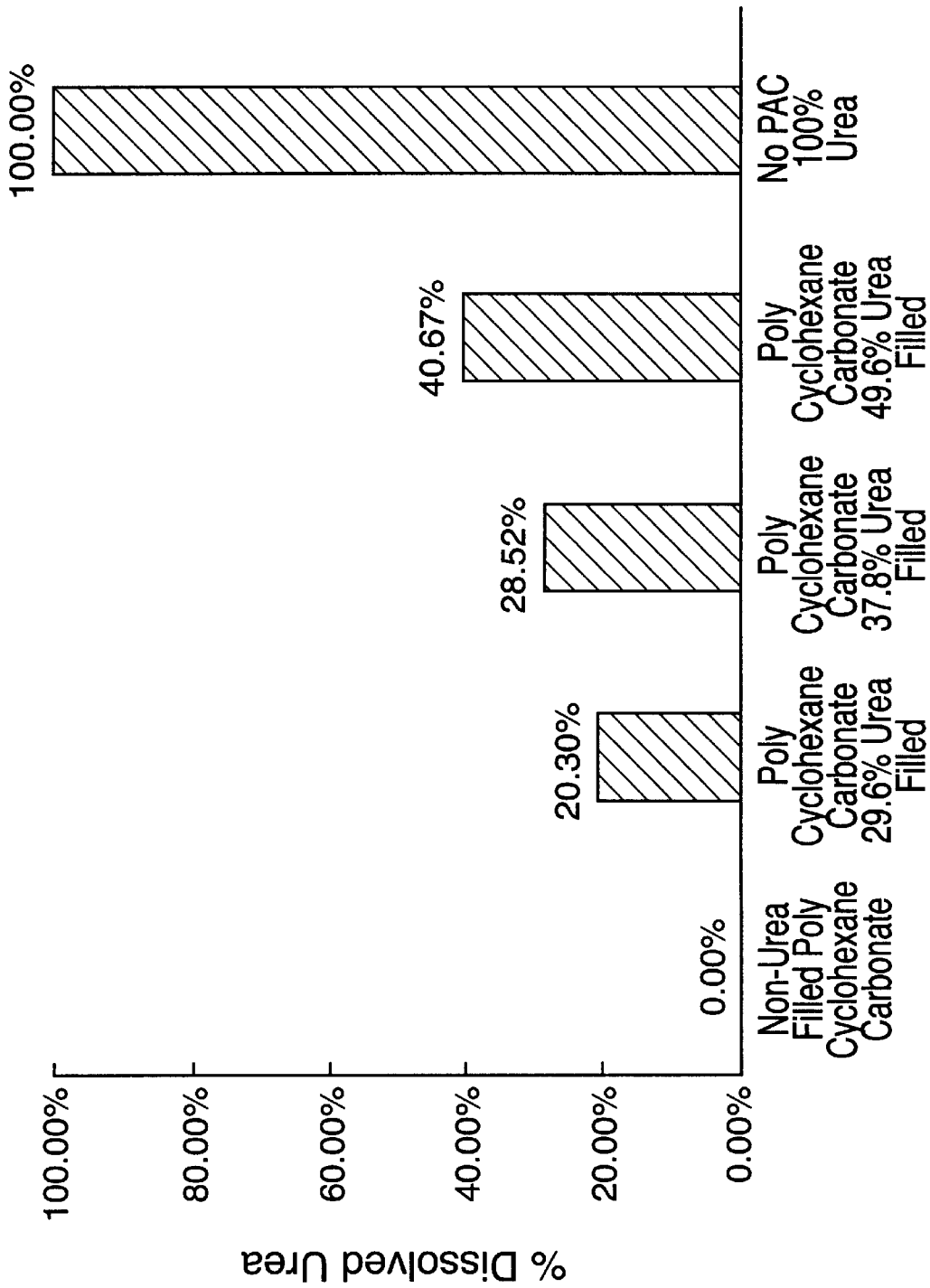
FIG. 3 is a graph illustrating the percent dissolved urea in an aqueous sample per total urea present in polyalkylene carbonate materials having a first filler comprising 29.6% urea-filled poly(cyclohexane carbonate), a second filler comprising 37.8% urea-filled poly(cyclohexane carbonate) and a third filler comprising 49.6% urea-filled poly(cyclohexane carbonate).

FIG. 3 illustrates the percent dissolved urea per total urea present for various samples of poly(cyclohexane carbonate). No dissolution was observed from the sample containing solely poly(cyclohexane carbonate). One hundred percent of the sample containing solely urea was dissolved. Generally, increasing the amount of poly(cyclohexane carbonate) filler reduced the amount of urea that was leached per total amount of urea present. When 29.6% urea-filled poly (cyclohexane carbonate) was used, the amount of urea leached was 20.3%. When 37.8% urea-filled poly (cyclohexane carbonate) was used, the amount of urea leached was 28.52%. And when 49.6% urea-filled poly (cyclohexane carbonate) was used, the amount of urea leached was 40.67%.

EXAMPLE 3

This example examines the dissolution of urea from conventional wax fillers in a conventional wax formulation. 3 10-gram samples of a conventional wax were placed in three separate beakers. The wax samples were heated to a temperature of about 150–160° F. 25 weight percent filler was added to the melted wax formulations: a first sample comprised 29.6% urea coated with poly(cyclohexane carbonate); a second sample comprised 37.8% by weight urea coated with poly(cyclohexane carbonate); and a third sample comprised 49.6% by weight urea coated with poly (cyclohexane carbonate). Wax pills were made from these samples by pouring the mixtures into a die at 1 atmosphere.

Upon cooling, the samples were cut into cubes having a length of about 0.42 inch. These cubes were then placed in separate beakers (i.e., one cube per beaker). The beakers were filled with deionized water, covered, placed in an oven at 55° C. and left for 16 hours. Water was removed by vacuum. The urea residue remaining was then weighed to determine the amount of urea leached per sample.

Figure 4:
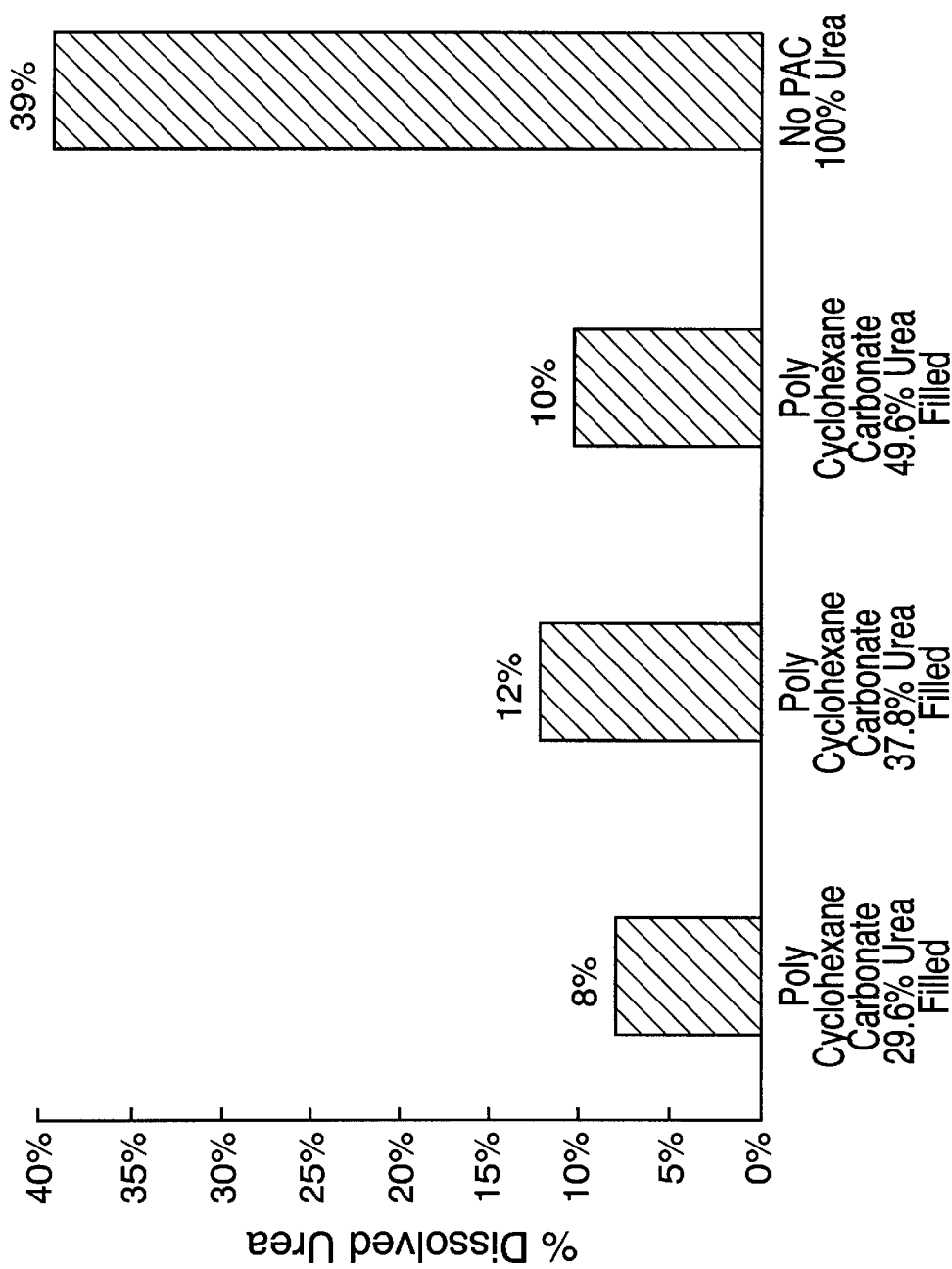
FIG. 4 is a graph illustrating the percent urea leached per total urea present versus a control comprising a urea-filled conventional wax versus a first wax sample comprising 29.6% urea-filled poly(cyclohexane carbonate), a second sample comprising 37.8% urea-filled poly(cyclohexane carbonate) and a third sample comprising 49.6% urea-filled poly(cyclohexane carbonate).

FIG. 4 is a graph of the percent urea leached from various samples versus the total amount of urea present for each of the cube samples described above. FIG. 4 shows that about 39% urea was leached from the sample comprising conventional wax and urea filler. 8% by weight urea was leached from the sample comprising conventional wax and 29.6% urea-filled poly(cyclohexane carbonate). Thus, using polymeric organic carbonate fillers as described herein in addition to conventional urea fillers can substantially reduce the amount of urea filler leached from pattern wax compositions. About 12% urea was leached from the sample comprising conventional wax and 37.8% urea filler coated with poly(cyclohexane carbonate). About 10% urea was reached from the sample comprising 49.6% urea filler coated with poly(cyclohexane carbonate).

The present invention has been described in accordance with working embodiments. However, it will be understood that certain modifications may be made thereto without departing from the invention. We claim as my invention the preferred embodiment and all such modifications and equivalents as come within the true spirit and scope of the following claims.

We claim:

1. A wax composition useful for forming investment casting patterns, comprising:
   pattern wax; and
   from about 1% to about 85% by weight of a crosslinked polymeric organic carbonate filler material.

2. The composition according to claim 1 where the polymeric organic carbonate filler material is selected from the group consisting of (a) inter- and/or intra-crosslinked polymeric organic carbonates, (b) inter- and/or intra-crosslinked copolymers of organic carbonates and organic noncarbonates, (c) inter- and/or intra-crosslinked block copolymers of organic carbonates and organic noncarbonates, (d) homogeneous and heterogeneous mixtures of at least one inter- and/or intra-crosslinked polymeric organic carbonate and at least one inter- and/or intra-crosslinked polymeric organic noncarbonate, (e) homogeneous and heterogeneous mixtures of at least one polymeric organic carbonate and at least one polymeric organic noncarbonate, at least one of the polymeric organic carbonate or polymeric organic noncarbonate being inter- and/or intra-crosslinked, (f) homogeneous and heterogeneous mixtures of at least one inter- and/or intra-crosslinked copolymer of an organic carbonate and an organic noncarbonate and at least one polymeric organic noncarbonate, (g) homogeneous and heterogeneous mixtures of at least one inter- and/or intra-crosslinked block copolymer of an organic carbonate and an organic noncarbonate, and at least one polymeric organic noncarbonate, (h) homogeneous and heterogeneous mixtures of at least one inter- and/or intra-crosslinked copolymer of an organic carbonate and an organic noncarbonate and at least one inter- and/or intra-crosslinked polymeric organic noncarbonate, (i) homogeneous and heterogeneous mixtures of at least one inter- and/or intra-crosslinked block copolymer of an organic carbonate and an organic noncarbonate and at least one inter- and/or intra-crosslinked polymeric organic noncarbonate, (j) homogeneous and heterogeneous mixtures of at least one copolymer of an organic carbonate and an organic noncarbonate and at least one inter- and/or intra-crosslinked polymeric organic noncarbonate, (k) homogeneous and heterogeneous mixtures of at least one block copolymer of an organic carbonate and an organic noncarbonate and at least one inter- and/or intra-crosslinked polymeric organic noncarbonate, (l) conventional fillers in admixture with any of the preceding (a)–(k), (m) homogeneous and heterogeneous mixtures of at least two of (a)–(k), and (n) homogeneous and heterogeneous mixtures of at least two of (a)–(k), wherein length of separation between such materials is from about 0 $\mu$m to about 400 $\mu$m.

3. The composition according to claim 1 comprising from about 1 to about 85 volume percent filler.

4. The composition according to claim 3 where the polymeric organic carbonate inter- and/or intra-crosslinked filler comprises from about 1 to about 100 percent of the total filler amount.

5. The composition according to claim 3 where the polymeric organic carbonate filler comprises from about 5% by weight to about 100% by weight of the total filler amount.

6. The composition according to claim 1 where the organic-carbonate-based filler material is selected from the group consisting of (a) inter- and/or intra-crosslinked polymeric organic carbonates, (b) inter- and/or intra-crosslinked copolymers of organic carbonates and organic noncarbonates, (c) homogeneous and heterogeneous mixtures of at least one polymeric organic carbonate and at least one polymeric organic noncarbonate, at least one of the polymeric organic carbonate or polymeric organic noncarbonate being inter- and/or intra-crosslinked, and (d) homogeneous and heterogeneous mixtures of at least one inter- and/or intra-crosslinked copolymer of an organic carbonate and an organic noncarbonate and at least one polymeric organic noncarbonate.

7. The composition according to claim 6 and further comprising conventional pattern wax filler materials.

8. The composition according to claim 1 and including from about 5% to about 75% by weight polymeric organic carbonate filler material.

9. The composition according to claim 1 and including from about 10% to about 50% by weight polymeric organic carbonate filler material.

10. The composition according to claim 1 and including from about 30% to about 40% by weight polymeric organic carbonate filler material.

11. The composition according to claim 1 where the polymeric organic carbonate filler material is a polyalkylene carbonate.

12. The composition according to claim 11 where the polyalkylene carbonate is selected from the group consisting of inter- and/or intra-crosslinked polyethylene carbonates, polypropylene carbonates, copolymers of these carbonates, block copolymers of these carbonates, and mixtures thereof.

13. The composition according to claim 1 where the polymeric organic carbonate filler is polycyclohexane carbonate.

14. The composition according to claim 1 where the polymeric organic carbonate filler comprises polystyrene.

15. The composition according to claim 1 where the polymeric organic carbonate filler material is a copolymer comprising polycyclohexane propylene carbonate-polystyrene.

16. The composition according to claim 15 where the polymeric organic carbonate filler material is polycyclohexane propylene carbonate.

17. The composition according to claim 1 and further including a material selected from the group consisting of waxes and resinous materials, conventional fillers, ultraviolet curable monomers, plasticizers, lubricants, and mixtures thereof.

18. The composition according to claim 1 and further including a water-soluble filler material.

19. The composition according to claim 18 where the water-soluble filler material is urea.

20. The composition according to claim 19 where the urea is copolymerized with the polymeric organic carbonate filler material.

21. A wax composition useful for forming investment casting patterns, comprising:
pattern wax;
urea filler; and
from about 10% to about 50% by weight of an polymeric organic carbonate filler material.

22. The composition according to claim 21 where the polymeric organic carbonate filler material is selected from the group consisting of (a) inter- and/or intra-crosslinked polymeric organic carbonates, (b) inter- and/or intra-crosslinked copolymers of organic carbonates and organic noncarbonates, (c) inter- and/or intra-crosslinked block copolymers of organic carbonates and organic noncarbonates, (d) homogeneous and heterogeneous mixtures of at least one inter- and/or intra-crosslinked polymeric organic carbonate and at least one inter- and/or intra-crosslinked polymeric organic noncarbonate, (e) homogeneous and heterogeneous mixtures of at least one polymeric organic carbonate and at least one polymeric organic noncarbonate, at least one of the polymeric organic carbonate or polymeric organic noncarbonate being inter- and/or intra-crosslinked, (f) homogeneous and heterogeneous mixtures of at least one inter- and/or intra-crosslinked copolymer of an organic carbonate and an organic noncarbonate and at least one polymeric organic noncarbonate, (g) homogeneous and heterogeneous mixtures of at least one inter- and/or intra-crosslinked block copolymer of an organic carbonate and an organic noncarbonate, and at least one polymeric organic noncarbonate, (h) homogeneous and heterogeneous mixtures of at least one inter- and/or intra-crosslinked copolymer of an organic carbonate and an organic noncarbonate and at least one inter- and/or intra-crosslinked polymeric organic noncarbonate, (i) homogeneous and heterogeneous mixtures of at least one inter- and/or intra-crosslinked block copolymer of an organic carbonate and an organic noncarbonate and at least one inter- and/or intra-crosslinked polymeric organic noncarbonate, (j) homogeneous and heterogeneous mixtures of at least one copolymer of an organic carbonate and an organic noncarbonate and at least one inter- and/or intra-crosslinked polymeric organic noncarbonate, (k) homogeneous and heterogeneous mixtures of at least one block copolymer of an organic carbonate and an organic noncarbonate and at least one inter- and/or intra-crosslinked polymeric organic noncarbonate, (l) conventional fillers in admixture with any of the preceding (a)–(k), (m) homogeneous and heterogeneous mixtures of at least two of (a)–(k), and (n) homogeneous and heterogeneous mixtures of at least two of (a)–(k), wherein length of separation between such materials is from about 0 µm to about 400 µm.

23. The composition according to claim 22 where the polymeric organic carbonate filler material is selected from the group consisting of (a) inter- and/or intra-crosslinked polymeric organic carbonates, (b) inter- and/or intra-crosslinked copolymers of organic carbonates and organic noncarbonates, (c) homogeneous and heterogeneous mixtures of at least one polymeric organic carbonate and at least one polymeric organic noncarbonate, at least one of the polymeric organic carbonate or polymeric organic noncarbonate being inter- and/or intra-crosslinked, and (d) homogeneous and heterogeneous mixtures of at least one inter- and/or intra-crosslinked copolymer of an organic carbonate and an organic noncarbonate and at least one polymeric organic noncarbonate.

24. A method for forming an investment casting pattern, comprising:
providing a pattern wax composition;
providing from about 1% to about 80% by weight of a polymeric organic carbonate filer material;
forming a mixture comprising the pattern wax and the polymeric organic carbonate filler material; and
forming an investment casting pattern from the mixture.

25. The method according to claim 24 where the polymeric organic carbonate filler material is selected from the group consisting of (a) inter- and/or intra-crosslinked polymeric organic carbonates, (b) inter- and/or intra-crosslinked copolymers of organic carbonates and organic noncarbonates, (c) inter- and/or intra-crosslinked block copolymers of organic carbonates and organic noncarbonates, (d) homogeneous and heterogeneous mixtures of at least one inter- and/or intra-crosslinked polymeric organic carbonate and at least one inter- and/or intra-crosslinked polymeric organic noncarbonate, (e) homogeneous and heterogeneous mixtures of at least one polymeric organic carbonate and at least one polymeric organic noncarbonate, at least one of the polymeric organic carbonate or polymeric organic noncarbonate being inter- and/or intra-crosslinked, (f) homogeneous and heterogeneous mixtures of at least one inter- and/or intra-crosslinked copolymer of an organic carbonate and an organic noncarbonate and at least one polymeric organic noncarbonate, (g) homogeneous and heterogeneous mixtures of at least one inter- and/or intra-crosslinked block copolymer of an organic carbonate and an organic noncarbonate, and at least one polymeric organic noncarbonate, (h) homogeneous and heterogeneous mixtures of at least one inter- and/or intra-crosslinked copolymer of an organic carbonate and an organic noncarbonate and at least one inter- and/or intra-crosslinked polymeric organic noncarbonate, (i) homogeneous and heterogeneous mixtures of at least one inter- and/or intra-crosslinked block copolymer of an organic carbonate and an organic noncarbonate and at least one inter- and/or intra-crosslinked polymeric organic noncarbonate, (j) homogeneous and heterogeneous mixtures of at least one copolymer of an organic carbonate and an organic noncarbonate and at least one inter- and/or intra-crosslinked polymeric organic noncarbonate, (k) homogeneous and heterogeneous mixtures of at least one block copolymer of an organic carbonate and an organic noncarbonate and at least one inter- and/or intra-crosslinked polymeric organic noncarbonate, (l) conventional fillers in admixture with any of the preceding (a)–(k), (m) homogeneous and heterogeneous mixtures of at least two of (a)–(k), and (n) homogeneous and heterogeneous mixtures of at least two of (a)–(k), wherein length of separation between such materials is from about 0 µm to about 400 µm.

26. The method according to claim 24 where the mixture further includes a material selected from the group consisting of waxes and resinous materials, conventional fillers, ultra-violet curable monomers, plasticizers, lubricants, and mixtures thereof.

27. The method according to claim 24 where the mixture further includes urea filler material.

28. The method according to claim 24 where the mixture comprises from about 5% to about 75% by weight polymeric organic carbonate filler material.

29. The method according to claim 24 where the mixture comprises from about 10% to about 50% by weight polymeric organic carbonate filler material.

30. The method according to claim 24 where the mixture comprises from about 30% to about 40% by weight polymeric organic carbonate filler material.

31. A method for casting a metal article, comprising:
   forming an investment casting pattern comprising pattern wax and from about 1% to about 80% of a polymeric organic carbonate filler material;
   forming a mold about the pattern;
   removing the pattern from the mold;
   introducing molten metal or alloy into the mold; and
   allowing the metal or alloy to solidify inside the mold, thereby forming a metal article.

32. The method according to claim 31 where the pattern comprises a material selected from the group consisting of (a) inter- and/or intra-crosslinked polymeric organic carbonates, (b) inter- and/or intra-crosslinked copolymers of organic carbonates and organic noncarbonates, (c) inter- and/or intra-crosslinked block copolymers of organic carbonates and organic noncarbonates, (d) homogeneous and heterogeneous mixtures of at least one inter- and/or intra-crosslinked polymeric organic carbonate and at least one inter- and/or intra-crosslinked polymeric organic noncarbonate, (e) homogeneous and heterogeneous mixtures of at least one polymeric organic carbonate and at least one polymeric organic noncarbonate, at least one of the polymeric organic carbonate or polymeric organic noncarbonate being inter- and/or intra-crosslinked, (f) homogeneous and heterogeneous mixtures of at least one inter- and/or intra-crosslinked copolymer of an organic carbonate and an organic noncarbonate and at least one polymeric organic noncarbonate, (g) homogeneous and heterogeneous mixtures of at least one inter- and/or intra-crosslinked block copolymer of an organic carbonate and an organic noncarbonate, and at least one polymeric organic noncarbonate, (h) homogeneous and heterogeneous mixtures of at least one inter- and/or intra-crosslinked copolymer of an organic carbonate and an organic noncarbonate and at least one inter- and/or intra-crosslinked polymeric organic noncarbonate, (i) homogeneous and heterogeneous mixtures of at least one inter- and/or intra-crosslinked block copolymer of an organic carbonate and an organic noncarbonate and at least one inter- and/or intra-crosslinked polymeric organic noncarbonate, (j) homogeneous and heterogeneous mixtures of at least one copolymer of an organic carbonate and an organic noncarbonate and at least one inter- and/or intra-crosslinked polymeric organic noncarbonate, (k) homogeneous and heterogeneous mixtures of at least one block copolymer of an organic carbonate and an organic noncarbonate and at least one inter- and/or intra-crosslinked polymeric organic noncarbonate, (l) conventional fillers in admixture with any of the preceding (a)–(k), (m) homogeneous and heterogeneous mixtures of at least two of (a)–(k), and (n) homogeneous and heterogeneous mixtures of at least two of (a)–(k), wherein length of separation between such materials is from about 0 $\mu$m to about 400 $\mu$m.

33. The method according to claim 31 where the investment casting pattern includes from about 5% to about 75% by weight polymeric organic carbonate filler material.

34. The method according to claim 31 where the investment casting pattern includes from about 10% to about 50% by weight polymeric organic carbonate filler material.

35. The method according to claim 31 where the investment casting pattern includes from about 30% to about 40% by weight polymeric organic carbonate filler material.

36. The method according to claim 31 where the polymeric organic carbonate filler material is a polyalkylene carbonate.

37. The method according to claim 36 where the polyalkylene carbonate is polyethylene carbonate, polypropylene carbonate, copolymers of these carbonates, block copolymers of these carbonates, and mixtures thereof.

38. The method according to claim 31 where the polymeric organic carbonate filler material is polycyclohexane carbonate.

39. The method according to claim 31 where the polymeric organic carbonate filler material comprises polystyrene.

40. The method according to claim 31 where the polymeric organic carbonate filler material is a copolymer comprising polycyclohexane propylene carbonate-polystyrene.

41. The method according to claim 40 where the filler material is polycyclohexane propylene carbonate.

42. The method according to claim 31 where the polymeric organic carbonate filler material is crosslinked.

43. The method according to claim 31 where the pattern further comprises urea filler.

44. The method according to claim 43 wherein the polymeric organic carbonate filler material is copolymerized with the urea filler.

45. A wax composition useful for forming investment casting patterns, comprising:
   pattern wax;
   from about 1% to about 85% by weight of at least two filler materials including a polymeric organic carbonate filler material, at least one of the filler materials being crosslinked.

* * * * *